United States Patent [19]
Kleinerman et al.

[11] 3,873,771
[45] Mar. 25, 1975

[54] SIMULTANEOUS TRANSMISSION OF A VIDEO AND AN AUDIO SIGNAL THROUGH AN ORDINARY TELEPHONE TRANSMISSION LINE

[75] Inventors: Ben Kleinerman, New Hyde Park; Meyer J. Geist, East Meadow, both of N.Y.

[73] Assignee: Telescan Communications Systems, Inc., East Meadow, N.Y.

[22] Filed: Apr. 11, 1972

[21] Appl. No.: 242,946

[52] U.S. Cl. .......... 179/2 TV, 178/5.6, 178/DIG. 3, 178/DIG. 23, 179/4, 179/15 FD
[51] Int. Cl. .......... H04j 1/20, H04j 9/00
[58] Field of Search .......... 179/2 TV, 15 BT, 15 FD, 179/2 DP, 15.55, 2.5, 3, 4, 15 BM; 178/5.6, 5.8, DIG. 3, DIG. 7, DIG. 23, 35; 325/47, 48, 51, 57; 343/200, 207

[56] References Cited

UNITED STATES PATENTS

| | | | |
|---|---|---|---|
| 2,378,298 | 6/1945 | Hilferty | 325/47 |
| 2,982,813 | 5/1961 | Hathaway | 178/5.6 |
| 3,061,670 | 10/1962 | Oster et al. | 178/DIG. 3 |
| 3,261,922 | 7/1966 | Edson et al. | 179/2 DP |
| 3,471,638 | 10/1969 | De Groat | 179/4 |
| 3,723,653 | 3/1973 | Tatsuzawa | 179/2 TV |

OTHER PUBLICATIONS

"TV Pictures Ride F–M Bands in Slow-Scan Trials" – Electronics Magazine, Nov. 8, 1971, page 36.

*Primary Examiner*—Robert L. Griffin
*Assistant Examiner*—Marc E. Bookbinder
*Attorney, Agent, or Firm*—Kirschstein, Kirschstein, Ottinger & Frank

[57] ABSTRACT

A communication system for simultaneously transmitting a video and audio signal through the same transmission line. The transmission line can be a standard telephone line, and the video signal can be transmitted by FM slow scan TV techniques, while the audio signal can be transmitted by AM single sideband techniques. Simultaneous transmission of video and voice is accomplished over the same transmission line by separating the AM signal and FM signal into separate channels, and since AM reception is relatively insensitive to FM, and FM reception is relatively insensitive to AM, the signals do not interfere with one another.

1 Claim, 3 Drawing Figures

SIMULTANEOUS TRANSMISSION OF A VIDEO AND AN AUDIO SIGNAL THROUGH AN ORDINARY TELEPHONE TRANSMISSION LINE

BACKGROUND OF THE INVENTION

1. Field of the Invention

This invention relates to a communication system for sending a video and voice signal over the same transmission line.

2. Description of the Prior Art

Often times it is desirable that voice communication between remote stations be supplemented by video communication. One such situation relates to when a show-room is a great distance from a factory and communication is necessary between the two locations. Executives in the showroom may be anxious to know the results of a pattern or product which has just been fabricated in the factory, and may even want to exhibit this pattern or product to a buyer who is presently in the show-room. It would therefore be convenient if the visual display could be transmitted through a transmission line, such as the telephone line. Of course, voice instruction between the showroom and the factory would also be necessary, and it would be greatly desirable that this voice instruction be transmitted between locations simultaneously with the video transmission, so as to obtain maximum benefit out of the transmission of the video signal.

In security systems for apartment houses or large factories, it may be desirable to visually observe an individual passing through a check point, while also monitoring his voice. In other situations, visual and voice communication may be desirable using standard intercom lines in offices and factories.

While it has been found that FM video signals can be sent through transmission lines, such as telephone lines, it has not been practical to simultaneously send a voice signal over that same transmission line. The normal video transmission system is an FM system which occupies a specific portion of the bandwidth of the telephone line which ranges from 0 to 4000 Hz. The FM video signal, which may be in the form of a slow scan TV signal that transmits a full picture over the line within say approximately 8 seconds, may occupy a bandwidth ranging from 1,200 to 2,300 Hz. The voice signal could then be sent between 0 and 1,000 Hz and approximately 2,500 to 4,000 Hz. However, at such low frequencies, modulation of voice signals using FM techniques is unreasonably expensive and impractical, and even when accomplished the audio signal has a tendency to interfere with the video signal and cause erratic transmission.

A band-pass filter may be used to allow transmission of the voice signal between 0 to 1,000 Hz and 2,500 to 4000 Hz. However, it is impractical to design a filter which has a flat frequency response at 1,000 Hz and then 40 to 60 DB attenuation at 1,200 Hz. Thus, this audio signal passing through the filter will not be sufficiently attenuated and will have a component at 1,200 Hz. Since the slow scan FM signal has its sync pulse at 1,200 Hz, the audio signal will falsely trigger the sync pulse of the video signal, and thus garble transmission of the video signal.

SUMMARY OF THE INVENTION

1. Purpose of the Invention

It is therefore an object of this invention to achieve simultaneous transmission of a video and voice signal through the same transmission line.

It is a further object of this invention to achieve simultaneous transmission of video and voice signals through the same telephone line.

It is a still further object of this invention to provide a communication system which sends a video and voice signal simultaneously through the same transmission line, wherein the voice signal does not interfere with the transmission of the video signal and the video signal does not interfere with the transmission of the voice signal.

Other objects of the invention will in part be obvious and in part be pointed out hereinafter.

2. Brief Description of the Invention

According to a broad aspect of the invention there is provided a communication system for simultaneously transmitting a video and voice signal through a transmission line. The transmission line may be a telephone line. The video signal may be in the form of an FM slow scan TV signal and the voice signal may be in the form of an AM single side-band suppressed carrier signal. Each end of the transmission line contains means for receiving and transmitting the video and voice signals. While voice signals can always be transmitted in either direction simultaneously over the transmission line, means may be provided for insuring that the video signal is only transmitted in one direction at one time.

BRIEF DESCRIPTION OF THE DRAWINGS

In the accompanying drawings in which are shown various possible embodiments of my invention.

DESCRIPTION OF THE PREFERRED EMBODIMENT

Figure 1:
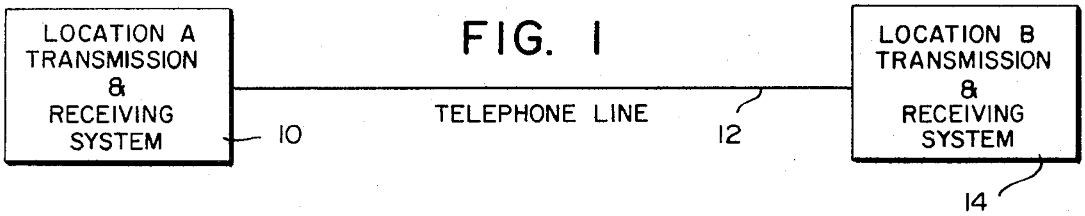
FIG. 1 is a simple schematic diagram showing transmission and receiving systems located at each end of the telephone line.

While FIG. 1 shows a transmission and receiving systme 10 at a location A at one end of a telephone line 12, and a transmission and receiving system 14 at a location B at the other end of telephone line 12, other lines, such as intercom lines or electric wiring, could be used in place thereof. The actual equipment at location A may be virtually identical to the equipment at location B, and for that reason the invention will be explained with reference to apparatus at one location as shown in FIG. 2.

Figure 3:
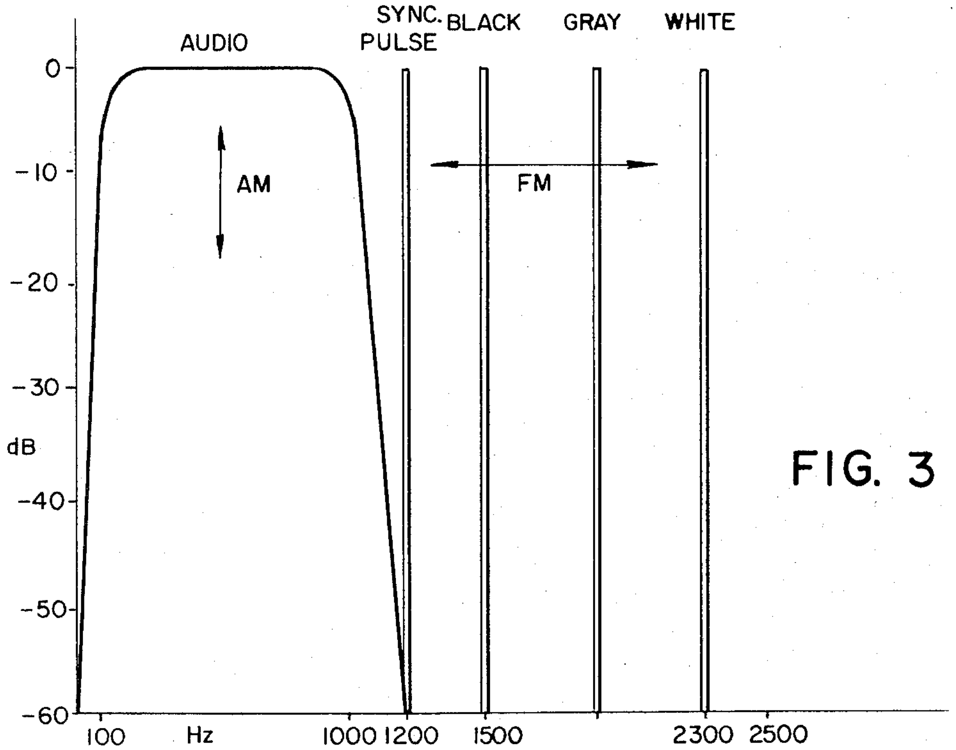
FIG. 3 shows frequency response of the AM and FM signals sent through the system shown in FIG. 2.
Figure 2:
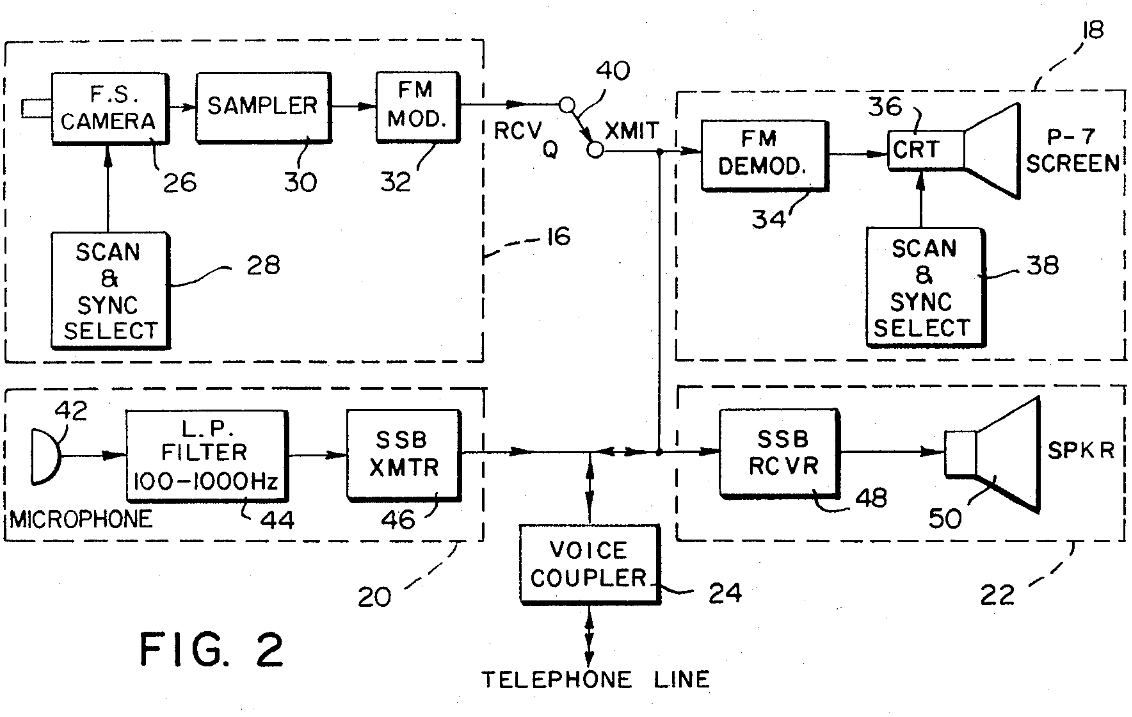
FIG. 2 is a schematic block diagram of the transmission and receiving system for one location.

Referring now to FIGS. 2 and 3, the invention will now be explained. As shown in FIG. 2, in block 16, there is provided apparatus for transmitting an FM video signal. In block 18 there is provided apparatus for receiving an FM video signal. In block 20 there is provided apparatus for transmitting an AM voice signal. In block 22 there is provided apparatus for receiving an AM voice signal, and in block 24, there is provided a voice coupler.

In this example, blocks 16 and 18 show the respective apparatus for transmission and reception of a slow scan TV signal. It should of course be understood that apparatus for transmission of other FM video signals, such as facsimile, can also be compatibly adapted for use in our system. A particular type of slow scan TV system which can be used in this example has been described in QST, August 1958, in an article entitled "A New Narrowband Image Transmission System" by Copthorne MacDonald.

The apparatus in block 16 produces an FM slowly scanned picture in approximately eight seconds. In this example the FM video signal occupies a transmission bandwidth ranging from 1,200 to 2,300 Hz, wherein at 1,200 Hz sync pulses are provided, while at 1,500 Hz black tones are transmitted, and at 2,300 Hz white tones are transmitted. In this example approximately 120 scanning lines per picture are produced which is generally sufficient for transmission of whatever video information is necessary. If more video detail is required, the bandwidth may be increased or the transmission time may be increased so that an increased number of scanning lines per picture can be transmitted.

The slow scan TV transmitter is comprised of a standard fast scan camera 26 which converts a video image to electrical impulses. A standard variable frequency or sweep generator 28, which generates the standard oscillating scanning and synchronization signals for the vertical and horizontal circuits, has its output signals electrically coupled to the fast scan camera in the well known manner. A sampler system 30 is coupled to the output of the fast scan camera, which sampler system is described in detail by Don Miller in CQ July 1969, and an FM modulator 32 is coupled to the output of sampler 30. The FM modulator 32 can be any standard FM modulator described in text and literature and the modulator used in this instance is a circuit block supplied by Signetics and is known as Signetics Encoder 566. The output of FM modulator 32 produces the standard slow scan FM TV signal which is routed through voice coupler 24 to the telephone line then to the FM receiver at the other location.

The slow scan TV signal is also routed to the FM receiver in block 18 at the same location. The FM receiver receives the slow scan TV signal at its FM demodulator 34. The FM demodulator can be any standard demodulator unit which will detect the slow scan FM video signals. In this instance the FM demodulator is a phase locked loop which follows the FM signal. The error signal which is created is the actual detected video signal. In this instance, the specific demodulator used is supplied by Signetics Corp. and is known as the Signetics PLL 565.

The detected video signal is fed from the output of demodulator 34 and into a standard cathode ray tube (CRT) 36. The output of a standard variable frequency generator 38 feeds scan and syncronization signals to the deflection circuits of the cathode ray tube to synchronize the detected signals so a steady pattern will appear on the screen of the cathode ray tube. The screen of the cathode ray tube in this instance is a P-7 phosphorous screen which has the ability to retain the image for approximately 8 to 10 seconds so that the full image being transmitted may be seen if the transmission time of the video picture itself takes 4 to 8 seconds.

It should be understood that other FM slow scan transmitting systems are as easily adaptable for use in this system, such as the system described in the QST article of June 1965, entitled "A Slow Scan Videcon Camera," which describes a system for transmitting slow scan TV within a bandwidth that extends between 1 to 2.5 Hz so as to transmit a picture every 8 seconds. U.S. Pat. No. 3,061,670 also discloses apparatus for sending a slow scan video signal over the telephone lines in about 3 minutes.

In the system shown in FIG. 2, which we will refer to as Station A, the FM video signal is routed directly from the output of FM modulator 32 to a select switch 40. If station A is to transmit a video signal to station B, select switch 40 is closed so that the signal is routed to the receiver at station A, and also through voice coupler 24 and the telephone line to the FM receiver at station B. An identical select switch at station B is open to prevent simultaneous transmission of the video FM signals in both directions through the telephone line. When the FM signal at station B is being transmitted, switch 40 at station A is open so as to disconnect transmission of the slow scan FM TV signal from the output of FM modulator 32.

It should be noted that voice coupler 24 is a standard unit which is provided by the Bell Telephone System.

The amplitude modulated transmission of a voice signal through the same telephone line is provided by a standard microphone 42, a low pass filter 44 and a standard single sideband transmitter 46. Low pass filter 44, in this example, is a standard filter having a flat frequency response from 100 to 1,000 Hz. The low pass filter could be any standard RC type filter and can be of the type described by Oliver Reed in "Recording and Reproducing of Sound," 1952. The amplitude modulated single sideband transmitter 46 could be a standard item or the type described by Donald Norgaard in QST in June 1948 entitled "A New Approach-Phasing Method of Generating Single Sideband." Single sideband transmitter 46 transmits the lower sideband 0 to 1,000 Hz signal, while supressing the carrier signal and upper side band signal. The amplitude modulated single sideband voice signal is then routed to voice coupler 24 and a single sideband receiver 48 at station A. Single sideband receiver 48 can be a standard unit described by Haywood and Bingham in an article in QST in November 1968, entitled "Direct Converstion—a Neglected Technique." The output of the single sideband receiver is fed into speaker 50 so that the voice signal transmitted at station A can also be heard at station A. Of course, the AM single sideband voice signal, after passing through the voice coupler, is transmitted to station B where it would be received by an identical sideband receiver and heard over a speaker. Of course, the identical single sideband transmitter at station B can be used to send the amplitude modulated voice signal through the telephone line so it is received by single sideband receiver 48 at station A and heard over speaker 50. In this example, there is no interrupt switch in series with the single sideband transmitters and voice communication can simultaneously continue in both directions over the telephone line.

Thus, in this system the FM slow scan video signal occupies a bandwidth from 1,200 to 2,300 Hz as shown in FIG. 3, while at the same time the AM single sideband signal occupies a bandwidth between 100 and 1,000 Hz. It should be noted from FIG. 3 that, due to the use of AM single sideband techniques, the audio signal can have a flat response approximately to 1,000 Hz and yet can have a 60 DB attenuation at 1,200 Hz so as not to interfere with the FM sync pulse which appears at 1,200 Hz, and in this manner the AM and FM signals are sufficiently separated so that video and voice can be simultaneously transmitted through the same transmission line or telephone line without interfering with one another. It should be noted that an additional AM single sideband signal having a bandwidth between 2,500 and 4,000 Hz could be transmitted through the telephone line if it is desired to improve the quality of the audio reception.

It is to be understood that FM video signals having a bandwidth ranging between 2,500 and 4,000 Hz can be sent through the telephone line from one station, while FM video signals having a bandwidth ranging between 1,200 and 2,300 Hz are sent through the telephone line from the other station, so that video signals can be simultaneously transmitted in both directions through the same telephone line.

It thus is seen that there is provided a communication system for simultaneously transmitting a video and audio signal through the same transmission line which achieves the several objects of the invention and is well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having now described the invention, there is claimed as new and is desired to be secured by Letters Patent:

1. A communication system for transmitting information through a telephone transmission line having a finite bandwidth of from 0 to 4,000 Hz, said bandwidth having two adjacent but separated segments, one extending over a lower frequency range than the second which extends over a higher frequency range, said system comprising:

a. means for transmitting an FM slow scan video signal through said transmission line in the second frequency range, b. means for simultaneously transmitting an audio signal through said transmission line in said one frequency range, c. the upper end of the lower segment being adjacent but spaced from the lower end of the upper segment, whereby said audio and FM signals are free of interference from one another, d. means for receiving said FM slow scan video signal from said telephone transmission line coupled to said telephone transmission line and the output of said FM slow scan video transmitting means, e. means for receiving said audio signal from said telephone transmission line coupled to said telephone transmission line and the output of said audio transmitting means, f. a switch for disconnecting the output of said FM slow scan video transmitting means from said FM slow scan video receiving means and said telephone transmission line, g. said audio transmitting means being always connected to said audio receiving means and said telephone transmission line, h. a second audio transmitting means in the physical vicinity of the FM slow scan video receiving means, i. a second audio receiving means in the physical vicinity of the first-named audio transmitting means, j. a second means for transmitting an F-M slow scan video signal through said transmission line in the second frequency range located in the physical vicinity of the second audio transmitting means, k. a second means for receiving an FM slow scan video signal from said telephone transmission line coupled to said telephone transmission line and the output of said second FM slow scan video signal transmitting means, said second FM receiving means located in the physical vicinity of said second audio receiving means, l. a switch for disconnecting the output of the second FM slow scan video transmitting means from said second FM slow scan video receiving means and said telephone transmission line, m. said second audio transmitting means and said second audio receiving means being connected to said telephone transmission line for transmitting an audio signal through said line over said one frequency range so that simultaneous voice communication in both directions through said telephone ne transmission line is possible, n. whereby said switches ensure slow scan of video communication through said telephone transmission line in one direction only at a given time.

* * * * *